United States Patent [19]

Sadvary

[11] Patent Number: 4,766,362
[45] Date of Patent: Aug. 23, 1988

[54] REGULATABLE PERMANENT MAGNET ALTERNATOR

[75] Inventor: John W. Sadvary, Little Falls, N.J.

[73] Assignee: Simmonds Precision Products, Inc., Tarrytown, N.Y.

[21] Appl. No.: 935,377

[22] Filed: Nov. 24, 1986

[51] Int. Cl.⁴ .............................................. H02K 21/14
[52] U.S. Cl. ........................................ 322/50; 310/90; 322/29; 322/51
[58] Field of Search ................................... 322/49–52, 322/29; 310/190, 191

[56] References Cited

U.S. PATENT DOCUMENTS

| | | | |
|---|---|---|---|
| 2,336,759 | 12/1943 | Stearns | 322/51 X |
| 4,027,229 | 5/1977 | Frink | 322/50 |
| 4,278,907 | 7/1981 | Landgraf et al. | 310/191 |
| 4,305,031 | 12/1981 | Wharton | 322/51 X |

Primary Examiner—R. J. Hickey
Attorney, Agent, or Firm—Dale R. Lovercheck

[57] ABSTRACT

The present invention provides an improved alternator system in which the magnetic flux modulating sleeve is carried by the rotor and rotates with the rotor. The position of the sleeve on the rotor is adapted to be adjusted during operation of the alternator while the rotor and sleeve are rotating. The repositioning of the sleeve on the rotor during rotation beneficially provides a more constant voltage output during load and speed variations. Concurrent rotor and sleeve rotation reduces eddy current losses in the magnetic circuit and increases alternator efficiency. The alternator of the invention is estimated to provide a constant voltage for a 10:1 variation in either electrical load (in OHMS) or rotor angular velocity (revolutions per minute, RPM), or a combined 10:1 variation of electrical load and rotor angular velocity.

30 Claims, 3 Drawing Sheets

4,766,362

REGULATABLE PERMANENT MAGNET ALTERNATOR

BACKGROUND OF THE INVENTION

The invention relates to the regulation of alternators. The invention provides improved control of alternators which utilize a sleeve for shunting and regulation of the rotor magnetic flux. Frink, in U.S. Pat. No. 4,027,229, discloses a regulatable permanent magnet alternator having a sleeve that is shiftable through 90 electrical degrees by means of a motor. The output of the alternator may be regulated between maximum and minimum values by so shifting the sleeve. The sleeve position is fixed during operation of the Frink alternator. The motor is connected by bolts through a plate to the sleeve. As taught by Frink, the sleeve need only rotate through 90 electrical degrees, i.e., an angle equal to one-half of the pole separation angle in order to shift the alternator between its minimum output condition and its maximum output condition. However, the sleeve is not adapted to be rotated during operation of the alternator.

BRIEF DESCRIPTION OF THE INVENTION

The present invention provides an improved alternator system in which the sleeve is carried by the rotor and rotates with the rotor. The position of the sleeve on the rotor is adapted to be adjusted during operation of the alternator while the rotor and sleeve are rotating. The repositioning of the sleeve on the rotor during rotation beneficially provides a more constant voltage output during load and speed variations.

In a preferred embodiment, the invention provides a regulatable permanent magnet alternator including: a stator member having at least one pair of poles; a rotor member having at least one pair of poles; permanent magnet field means on one of said members; armature windings on the other of the members; a hollow, cylindrical sleeve coaxial with the rotor member and connected to the rotor member, the sleeve extending between the rotor member and the stator member, the sleeve comprising a plurality of peripherally spaced bridging members, each of the bridging member including ferromagnetic material; means for shifting the angular position of the bridging members with respect to the rotor poles, and thereby controlling the magnetic flux linkage between the field means and the armature winding means.

The regulatable permanent magnet alterantor of the invention provides a constant voltage for a 10:1 variation in either electrical load (in OHMS) or rotor angular velocity (revolutions per minute, RPM), or a combined 10:1 variation of electrical load and rotor angular velocity.

DETAILED DESCRIPTION OF THE INVENTION

Figure 1:
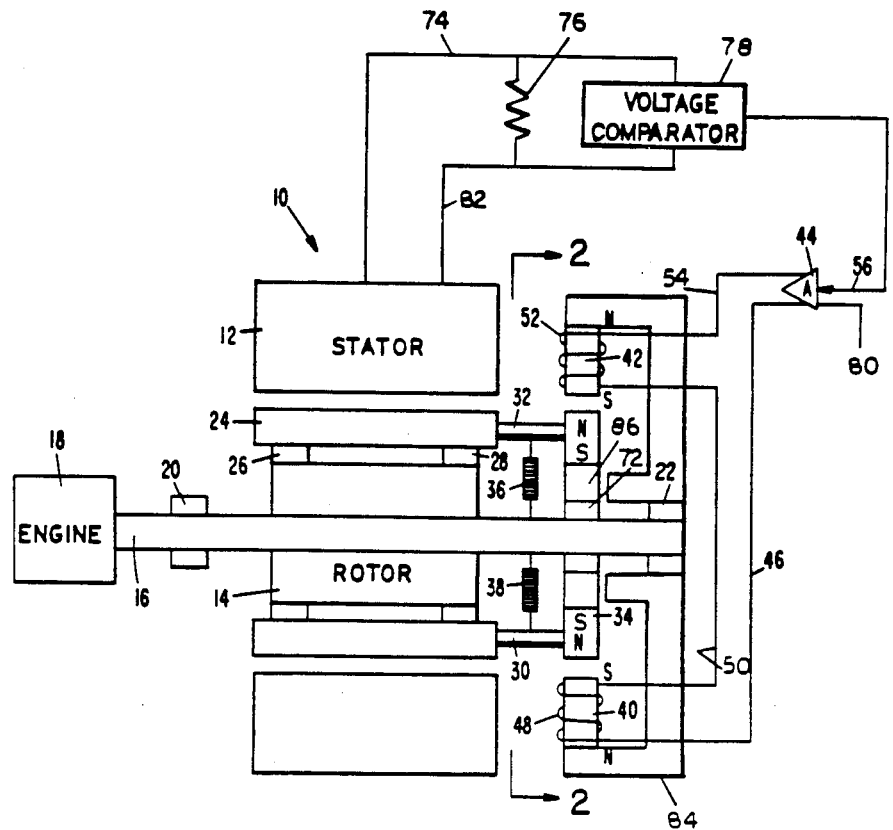
FIG. 1 is a cross-sectional view of a regulatable permanent magnet alternator which uses drag from a retarding motor in accordance with the present invention.

A preferred embodiment of the invention is shown in FIGS. 1–4. The same number in the several figures refers to the same item. With more particular reference to FIG. 1, a regulatable permanent magnet alternator which uses drag from a retarding motor in accordance with the present invention is shown generally at 10. The regulatable permanent alternator 10 includes a stator 12 and a rotor 14. The rotor 14 is driven through shaft 16 by engine 18. The shaft 16 is supported by bearings 20 and 22. Sleeve 24 is supported by rotor 14 thruogh bearings 26 and 28.

The sleeve 24 is connected by bolt 30 and bolt 32 to the permanent magnet assembly 34. Bearing 72 allows rotation of supporting plate 58 and permanent magnet assembly 34 in response to control current developed by amplifier 44 in electromagnets 40, 42. Spring 36 is connected to bolt 32 and shaft 16. Spring 38 is connected to bolt 30 and to shaft 16. Electromagnets 40 and 42 are positioned adjacent to the permanent magnet assembly 34. Electromagnet 40 is connected to servo amplifier 44 by line 46. The coil 48 of electromagnet 40 is connected by line 50 to the coil 52 of electromagnet 42. The coil 52 of electromagnet 42 is connected by line 54 to servo amplifier 44. Servo amplifier 44 receives error signals through line 56.

Support bearing 72 allows supporting plate 58 and permanent magnet assembly 34 to rotate on shaft 16. Lines 74 and 82 connect the alternator output to the electrical load 76 and the voltage comparator 78. The electrical load 76 may have variations in its impedance. Error signal 56 is developed in the voltage comparator 78 as a function of the difference between the desired voltage (which may be preselected) and the voltage developed by the alternator 10. Line 80 represents a dc voltage that provides a source of current for operation of the servo amplifier. This dc current may be provided by an external source or derived from the rectified output of the alternator. Stationary flux return path 84 acts in conjunction with rotor return flux path 86 to complete the retarding motor magnetic circuit.

Figure 2:
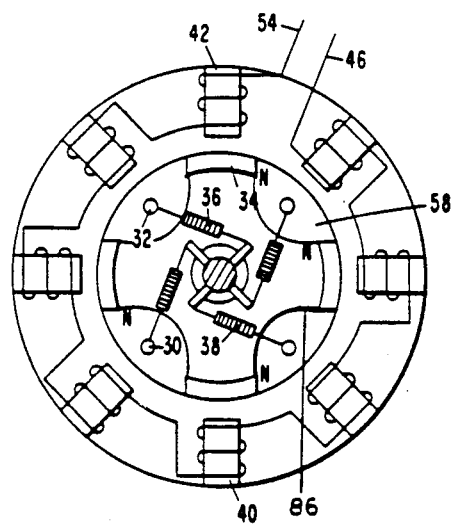
FIG. 2 is a cross-sectional view of the mechanism for shifting the angular position of the sleeve in accordance with the present invention.

FIG. 2 is a cross-sectional view at line 2—2 in FIG. 1 of the sleeve positioning portion of the alternator. It is seen in FIG. 2 that the permanent magnets 34 are supported by the plate 58.

Figure 3:
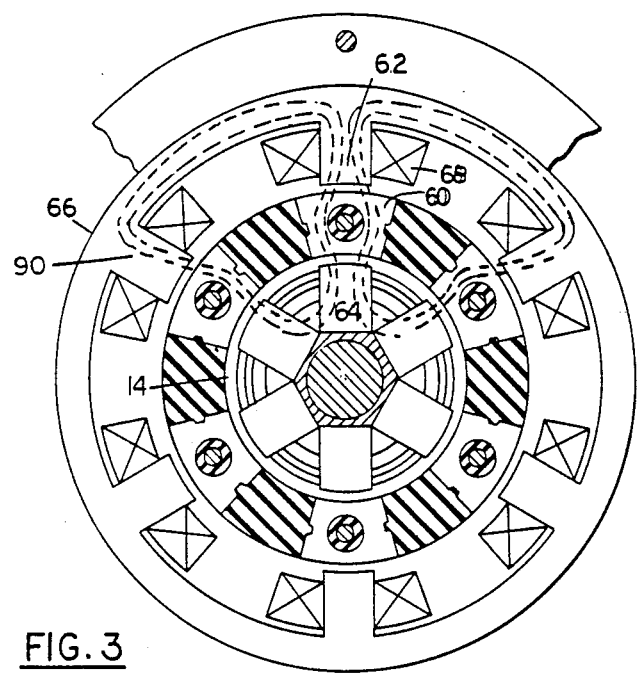
FIG. 3 is a cross-sectional view of a regulatable permanent magent alternator showing the sleeve in a position for maximum flux and maximum alternator output.

With more particular reference to FIG. 3, the sleeve is shown in position for maximum flux and maximum alternator output. The ferromagnetic bridging member 60 is shown as being aligned with the stator pole 62 and the flux path of lowest reluctance 90 is from one permanent magnet pole 64 to the next is through the aligned bridging members 60, the pole 62, and the annulus 66. The flux through the path 90 just described is at a maximum when the rotor 14 is in the angular position shown in FIG. 3. As the rotor turns, the rate of change of flux through the armature coils 68 is at a maximum and the alternator output is at its maximum.

Figure 4:
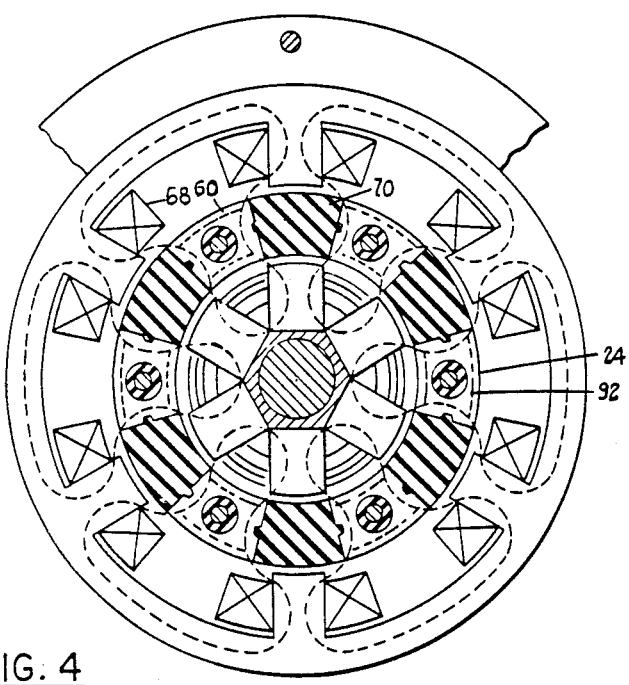
FIG. 4 is a cross-sectional view of a regulatable permanent magnet alternator in accordance with the present invention showing the sleeve in a position for minimum alternator output.

When the sleeve 24 is moved to the annular position shown in FIG. 4, the path of lowest reluctance 92 from one permanent magnet pole to the next is through the bridging member 60. This minimum reluctance path shunts away most of the rotor flux from the rotor poles. As the rotor turns, the rate of change of flux through the armature coils 68 is at a minimum and the alternator output is at its minimum. The members 60 are separated by an angle equal to the separation between two stator poles. Hence, the sleeve 24 need only rotate through 90 electrical degrees, i.e., an angle equal to half of the pole separation angle, in order to shift the alternator between its minimum output condition and its maximum output condition. In response to an error signal through line 56, the servo amplifier 44 provides a signal through line 46 to electromagnet 40. The signal continues through line 50 to electromagnet 42 as well as the electromagnets connected therebetween, as shown in FIG. 2. The field produced by the coils of the electromagnets 40 and 42 attract the adjacent poles of the permanent magnets 34. Because of the unidirectional rotation of the rotor, this attraction shifts the position of the sleeve 24 and provides tension in springs 36 and 38. The error signal may be in response to a load change or a variation in the speed of the driving engine 18 and the shifting of the position of the sleeve of the rotor may be to a position further from that shown in FIG. 3 to provide less additional output, and thus a more constant voltage. Similarly, the error signal may require the shifting of the position of the sleeve of the rotor to a position further from that shown in FIG. 4 to provide more additional output, and thus a more constant voltage. The disclosure of U.S. Pat. No. 4,027,229 is incorporated herein by reference in its entirety.

Figure 5:
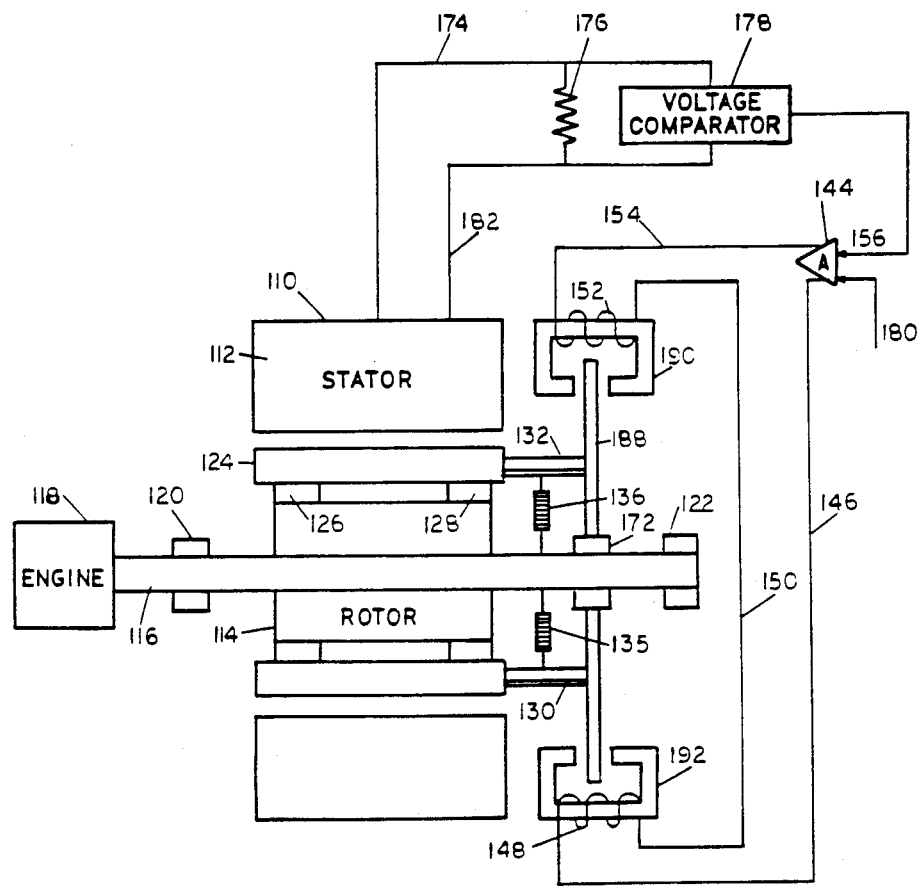
FIG. 5 is a cross-sectional view of a regulatable permanent magnet alternator which uses drag from an eddy current damper as a lower embodiment of FIG. 1.

The retarding motor which is made up of permanent magnet assembly 34, electromagnets 40, and 42, coil 48, and 52, plate 58, bearing 72, stationary flux return path 84 and rotor return flux path 86 may be replaced by an eddy current damper as shown in FIG. 5. This embodiment would be lower in cost than the embodiment of FIG. 1.

With more particular reference to FIG. 5, an alternative embodiment of a regulatable permanent magnet alternator in accordance with the present invention using eddy current dampening is shown generally at 110. The regulatable permanent alternator 110 includes a stator 112 and a rotor 114. The rotor 114 is driven through shaft 116 by engine 118. The shaft 116 is supported by bearings 120 and 122. Sleeve 124 is supported by rotor 114 through bearings 126 and 128.

The sleeve 124 is connected by bolt 130 and bolt 132 to electrically conducting disk 188. Bearing 172 allows rotation of disk 188 in response to control current developed by amplifier 144 in electromagnets 190 and 192. Spring 136 is connected to bolt 132 and shaft 116. Spring 138 is connected to bolt 130 and to shaft 116. Electromagnets 190 and 192 are positioned adjacent to the disk 188. Electromagnet 192 is connected to servo amplifier 144 by line 146. The coil 148 of electromagnet 192 is connected by line 150 to the coil 152 of electromagnet 190. The coil 152 of electromagnet 190 is connected by line 154 to servo amplifier 144. Servo amplifier 144 receives error signals through line 156 from voltage comparator 178. Support bearing 172 allows disk 188 to rotate on shaft 116.

Lines 174 and 182 connect the alternator output to the electrical load 176 and the voltage comparator 178. The load 176 may have impedance variations. An error signal is developed in the voltage comparator 178 as a function of the difference between the desired voltage and the voltage developed by the alternator 110. This error signal passes from comparator 178 to amplifier 144 through line 156. Line 180 represents a dc voltage that provides a source of current for operation of the servo amplifier 144. This dc current may be provided by an external source or derived from the rectified output of the alternator.

The conductive disk 188 has eddy currents induced in it which are dependent upon the magnetic flux developed by electromagnets 190 and 192 and the speed of the engine 118. Depending upon the magnetic flux induced in disk 188 by electromagnets 190 and 192, the circulating currents generate a drag or retarding torque. This retarding torque is equivalent to the drag of the retarding motor described above.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

I claim:

1. A regulatable permanent magnet alternator comprising:
    a stator member having at least one pair of poles;
    a rotor member having at least one pair of poles;
    permanent magnet field means on one of said members;
    armature windings on the other of said members;
    a hollow, cylindrical sleeve coaxial and concentric with said rotor member; said sleeve encompassing and connected to said rotor member, said sleeve extending between said poles of said rotor member and said poles of said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means.

2. The alternator of claim 1 wherein each bridging member comprises a stack of laminations of ferromagnetic material.

3. The alternator of claim 2 wherein the number of said bridging members is equal to the number of rotor poles.

4. The alternator of claim 1 wherein said means for shifting the angular position of the sleeve comprises amplifier means.

5. The alternator of claim 4 wherein said means for changing the position of said sleeve further comprises electromagnetic means.

6. The alternator of claim 1 wherein said means for shifting the position of said sleeve further comprises permanent magnet means.

7. A method of providing voltage of at most low variance during output load and rotor speed changes comprising:
    providing a regulatable permanent magnet alternator comprising: a stator member having at least one pair of poles; a rotor member having at least one pair of poles; permanent magnet field means on one of said members; armature windings on the other of said members; a hollow, cylindrical sleeve coaxial and concentric with said rotor member; said sleeve encompassing and connected to said rotor member, said sleeve extending between said poles of said rotor member and said poles of said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means;

and output means connected to said stator;

rotating said rotor means to produce a voltage of at most low variance.

8. The method of claim 7 wherein said voltage produced is substantially constant.

9. The method of claim 7 further comprising connecting a variable load to said output means.

10. A regulatable permanent magnet alternator comprising:

a stator member having at least one pair of poles;

a rotor member having at least one pair of poles;

permanent magnet field means on one of said members;

armature windings on the other of said members;

a hollow, cylindrical sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means, said means for shifting the position of said sleeve comprising electromagnetic means.

11. The alternator of claim 1 wherein each bridging member comprises a stack of laminations of ferromagnetic material.

12. The alternator of claim 11 wherein the number of said bridging members is equal to the number of rotor poles.

13. The alternator of claim 2 wherein said means for shifting the angular position of the sleeve comprises amplifier means.

14. The regulatable permanent magnet alternator comprising:

a stator member having at least one pair of poles;

a rotor member having at least one pair of poles;

permanent magnet field means on one of said members;

armature windings on the other of said members;

a hollow, cylindrical sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means, said means for shifting comprising an electrically conducting disk.

15. The alternator of claim 14 wherein each bridging member comprises a stack of laminations of ferromagnetic material.

16. The alternator of claim 15 wherein the number of said bridging members is equal to the number of rotor poles.

17. The alternator of claim 14 wherein said means for shifting the angular position of the sleeve comprises amplifier means.

18. A method of providing voltage of at most low variance during output load and rotor speed changes comprising:

providing a regulatable permanent magnet alternator comprising: a stator member having at least one pair of poles; a rotor member having at least one pair of poles; permanent magnet field means on one of said members; armature windings on the other of said members; a hollow, cylindrical sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means; and output means connected to said stator, said means for changing the angular position of said sleeve comprising an electrically conducting disk;

rotating said rotor means to produce a voltage of at most low variance.

19. The method of claim 18 wherein said voltage produced is substantially constant.

20. The method of claim 18 further comprising connecting a variable load to said output means.

21. A method of providing voltage of at most low variance during output load and rotor speed changes comprising:

providing a regulatable permanent magnet alternator comprising: a stator member having at least one pair of poles; a rotor member having at least one pair of poles; permanent magnet field means on one of sadi members; armature windings on the other of said members; a hollow, cylindrial sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means; and output means connected to said stator, said means for shifting the position of said sleeve comprising electromagnet means.

rotating said rotor means to produce a voltage of at most low variance.

22. The method of claim 21 wherein said voltage produced is substantially constant.

23. The method of claim 21 further comprising connecting a variable load to said output means.

24. A regulatable permanent magnet alternator comprising:

a stator member having at least one pair of poles;

a rotor member having at least one pair of poles;

permanent magnet field means on one of said members;

armature windings on the other of said members;

a hollow, cylindrical sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby shifting the magnetic flux linkage between the field means and the armature winding means, said means for shifting the angular position of said sleeve comprising spring means.

25. The alternator of claim 24 wherein each bridging member comprises a stack of laminations of ferromagnetic material.

26. The alternator of claim 25 wherein the number of said bridging members is equal to the number of rotor poles.

27. The alternator of claim 24 wherein said means for shifting the angular position of the sleeve comprises amplifier means.

28. A method of providing voltage of at most low variance during output load and rotor speed changes comprising:

providing a regulatable permanent magnet alternator comprising: a stator member having at least one pair of poles; a rotor member having at least one pair of poles; permanent magnet field means on one of said members; armature windings on the other of said members; a hollow, cylindrical sleeve coaxial with said rotor member and connected to said rotor member, said sleeve extending between said rotor member and said stator member, said sleeve comprising a plurality of peripherally spaced bridging members, each said bridging member including ferromagnetic material; means for shifting the angular position of said bridging members with respect to the rotor poles as the rotor rotates and thereby the magnetic flux linkage between the field means and the armature winding means;

and output means connected to said stator, said means for shifting the angular position of said sleeve comprising spring means, rotating said rotor means to produce a voltage of at most low variance.

29. The method of claim 28 wherein said voltage produced is substantially constant.

30. The method of claim 28 further comprising connecting a variable load to said output means.

* * * * *